US012795367B2

(12) United States Patent
Baskaran et al.

(10) Patent No.: US 12,795,367 B2
(45) Date of Patent: Nov. 10, 2026

(54) USER EQUIPMENT PARAMETER UPDATE HEADER PROTECTION

(71) Applicant: Lenovo (Singapore) Pte. Limited, Singapore (SG)

(72) Inventors: Sheeba Backia Mary Baskaran, Friedrichsdorf (DE); Roozbeh Atarius, La Jolla, CA (US); Andreas Kunz, Ladenburg (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 0 days.

(21) Appl. No.: 18/898,172

(22) Filed: Sep. 26, 2024

(65) Prior Publication Data

US 2025/0112780 A1 Apr. 3, 2025

Related U.S. Application Data

(60) Provisional application No. 63/587,021, filed on Sep. 29, 2023.

(51) Int. Cl.
*H04W 12/106* (2021.01)
*H04L 9/32* (2006.01)
(Continued)

(52) U.S. Cl.
CPC ......... *H04W 12/106* (2021.01); *H04L 9/3242* (2013.01); *H04L 63/123* (2013.01);
(Continued)

(58) Field of Classification Search
CPC .... H04W 12/106; H04W 8/08; H04L 9/3242; H04L 63/123; H04L 69/22
See application file for complete search history.

(56) References Cited

U.S. PATENT DOCUMENTS

2022/0053314 A1* 2/2022 Koshta ................ H04W 12/106
2022/0167157 A1* 5/2022 Tiwari .................. H04L 9/3242
(Continued)

FOREIGN PATENT DOCUMENTS

WO 2023031859 A1 3/2023
WO 2025012887 A1 1/2025

OTHER PUBLICATIONS

Hu, Xinxin; Liu, Caixia; Liu, Shuxin; You, Wei; Li, Yingle; Zhao, Yu; "A Systematic Analysis Method for 5G Non-Access Stratum Signalling Security," IEEE Access, vol. 7, Aug. 28, 2019, pp. 125424-125441.*
(Continued)

*Primary Examiner* — Victor Lesniewski
(74) *Attorney, Agent, or Firm* — FIG. 1 Patents

(57) ABSTRACT

Various aspects of the present disclosure relate to user equipment (UE) parameter update (UPU) header protection. An apparatus, such as a network equipment (NE) implements unified data management (UDM). The UDM transmits a request to an authentication server function (AUSF) to apply UPU header protection, and transmits a UPU transparent container and/or UPU header information to a UE. The UPU transparent container and/or the UPU header information includes an indication that a UPU header is protected. The UE receives a non-access stratum (NAS) message that includes an indication of the UPU header protection, computes a UPU message authentication code (MAC) using a UPU header as at least one input for UPU protection, and transmits an acknowledgement that indicates a UPU header verification is successful.

20 Claims, 10 Drawing Sheets

(51) Int. Cl.
*H04L 9/40* (2022.01)
*H04L 69/22* (2022.01)
*H04W 8/08* (2009.01)

(52) U.S. Cl.
CPC ............... *H04L 69/22* (2013.01); *H04W 8/08* (2013.01); *H04L 2209/80* (2013.01)

(56) References Cited

U.S. PATENT DOCUMENTS

| | | | | |
|---|---|---|---|---|
| 2023/0353379 | A1* | 11/2023 | Muhanna | H04L 9/3242 |
| 2024/0080662 | A1* | 3/2024 | Suh | H04W 12/037 |
| 2024/0171978 | A1* | 5/2024 | Palanigounder | H04W 12/06 |
| 2025/0112980 | A1* | 4/2025 | Gupta | H04L 67/54 |
| 2025/0386197 | A1* | 12/2025 | Mavureddi Dhanasekaran | H04W 12/35 |

OTHER PUBLICATIONS

Johnson, Chris; "Non-Access Stratum," Radio Access Networks for UMTS: Principles and Practice, Wiley Telecom, 2008, pp. 231-247.*

3GPP, "Non-Access-Stratum (NAS) protocol for 5G System (5GS); Stage 3", 3GPP TS 24.501 V18.4.0, retrieved from the internet on Dec. 10, 2024, <https://portal.3gpp.org/desktopmodules/Specifications/SpecificationDetails.aspx?specificationId=3370> (2 of 2), Sep. 2023, 579 pages.

3GPP, "Non-Access-Stratum (NAS) protocol for 5G System (5GS); Stage 3", 3GPP TS 24.501 V18.4.0, retrieved from the internet on Dec. 10, 2024, <https://portal.3gpp.org/desktopmodules/Specifications/SpecificationDetails.aspx?specificationId=3370> (1 of 2), Sep. 2023, 580 pages.

3GPP, "Security architecture and procedures for 5G System", 3rd Generation Partnership Project; Technical Specification Group Services and System Aspects (Release 17), Jun. 2021, 257 pages.

3GPP, "Security architecture and procedures for 5G system", 3GPP TS 33.501 V18.2.0, retrieved from the internet on Dec. 10, 2024, <https://portal.3gpp.org/desktopmodules/Specifications/SpecificationDetails.aspx?specificationId=3169>, Jun. 2023, 308 pages.

3GPP TSG-SA3 , "Protection of UPU header", 3GPP TSG-SA3 Meeting #111, S3-233870, Goteburg, Sweden, Aug. 14-18, 2023, retrieved from the internet on Dec. 11, 2024, https://www.3gpp.org/ftp/tsg_sa/WG3_Security/TSGS3_112_Goteborg/AgendaWithTdocAllocation_2023-09-01_14h29.htm, Aug. 2023, 3 pages.

Ericsson, "Discussion on protection of UE capabilities indication in UPU and "ME support of SOR-CMCI" indicator in SoR", 3GPP TSG-SA3 Meeting #104-e, S3-212736, Revision of S3-20xxxx, e-meeting, Aug. 2021, 9 pages.

Ericsson, et al., "Providing UE capability for additional parameters using UE Parameters Update via UDM Control Plane Procedure", SA WG2 Meeting #146E e-meeting, S2-2105841, Elbonia, Aug. 2021, 4 pages.

Huawei, et al., "Discussion on UE capabilities indication in UPU", 3GPP TSG-SA3 Meeting #103-e, S3-211860, Revision of S3-20xxxx, e-meeting, May 2021, 4 pages.

Lenovo, et al., "Update to Clause 6.15.2.1 Procedure for UE Parameters Update", 3GPP TSG-SA3 Meeting #105-e, S3-214165, e-meeting, Nov. 2021, 6 pages.

Nokia, et al., "Correction in UPU procedure to align with stage 3", 3GPP TSG-SA3 Meeting #108e, 53-221775, [retrieved from the internet on Aug. 15, 2022], <URL:https://ftp.3gpp.org/tsg_sa/WG3_Security/TSGS3_108e/Docs/S3-221775.zip S3-221775 Rel 17 correction in UPU procedure.docx>, Aug. 22, 2022, 5 pages.

Nokia, et al., "Enhancement in UPU procedure to protect UPU header—All 3 solutions", 3GPP TSG-SA3 Meeting #111, S3-232521, [retrieved from the internet on May 21, 2023], <URL:https://ftp.3gpp.org/Meetings_3GPP_SYNC/SA3/Docs/S3-232521.zip S3-232521 Rel 17 correction in UPU procedure for UPU header all solutions.docx>, May 22, 2023, 10 pages.

PCT/IB2022/058238, "International Search Report and Written Opinion", PCT Application No. PCT/IB2022/058238, Sep. 12, 2022, 14 pages.

PCT/IB2024/059496, "International Search Report and Written Opinion", International Application No. PCT/IB2024/059496, Dec. 4, 2024, 12 pages.

* cited by examiner

| 8 7 6 5 4 3 2 1 | |
|---|---|
| UE parameters update transparent container IEI | octet 1 |
| Length of UE parameters update transparent container contents | octet 2<br>octet 3 |
| UE parameters update header | octet 4 |
| UPU-MAC-$I_{AUSF}$ | octet 5-20 |
| $Counter_{UPU}$ | octet 21-22 |
| UE parameters update list | octet 23* - n* |

1000

Figure 10

| 8 | 7 | 6 | 5 | 4 | 3 | 2 | 1 | |
|---|---|---|---|---|---|---|---|---|
| 0<br>Spare | 0<br>Spare | 0<br>Spare | 0<br>Spare | 0<br>Spare | REG | ACK | UPU data type | octet 4 |

1100

Figure 11

| | |
|---|---|
| UE parameters update transparent container IEI | octet 1 |
| Length of UE parameters update transparent container contents | octet 2<br>octet 3 |
| UE parameters update header | octet 4 |
| UPU-MAC-$I_{UE}$ | octet 5 - 20 |

1200

Figure 12

| 8 | 7 | 6 | 5 | 4 | 3 | 2 | 1 | |
|---|---|---|---|---|---|---|---|---|
| 0<br>Spare | 0<br>Spare | 0<br>Spare | 0<br>Spare | 0<br>Spare | 0<br>Spare | 0<br>Spare | UPU data type | octet 4 |

1300

Figure 13

| | | | | | | | | |
|---|---|---|---|---|---|---|---|---|
| 0 Spare | 0 Spare | 0 Spare | 0 Spare | 0 Spare | UPU Header Protection Indication | REG | ACK | UPU data type |

1400

Figure 14

| | | | | | | | | |
|---|---|---|---|---|---|---|---|---|
| 0 Spare | 0 Spare | 0 Spare | 0 Spare | 0 Spare | UPU Header Protection Enabled Indication | REG | ACK | UPU data type |

1500

Figure 15

| | | | | | | | | |
|---|---|---|---|---|---|---|---|---|
| 0 Spare | 0 Spare | 0 Spare | 0 Spare | 0 Spare | 0 Spare | 0 Spare | UPU Header Protection Indication | UPU data type |

1600

Figure 16

| 8 | 7 | 6 | 5 | 4 | 3 | 2 | 1 | |
|---|---|---|---|---|---|---|---|---|
| 0 Spare | 0 Spare | 0 Spare | 0 Spare | UE parameters update data set 1 type | | | | octet 23* |
| Length of UE parameters update data set 1 | | | | | | | | octet 24*-25* |
| UE parameters update data set 1 | | | | | | | | octet 26*-x* |
| ... | | | | | | | | |
| 0 Spare | 0 Spare | 0 Spare | 0 Spare | UE parameters update data set X type specific to UPU header | | | | |
| Length of UE parameters update data set specific to UPU header information | | | | | | | | |
| UPU header information | | | | | | | | |
| 0 Spare | 0 Spare | 0 Spare | 0 Spare | UE parameters update data set n type | | | | octet y* |
| Length of UE parameters update data set n | | | | | | | | octet y+1*- y+2* |
| UE parameters update data set n | | | | | | | | octet y+3*- n* |

1700

Figure 17

USER EQUIPMENT PARAMETER UPDATE HEADER PROTECTION

RELATED APPLICATION

This application claims priority to U.S. Provisional Application Ser. No. 63/587,021 filed Sep. 29, 2023 entitled "User Equipment Parameter Update Header Protection," the disclosure of which is incorporated by reference herein in its entirety.

TECHNICAL FIELD

The present disclosure relates to wireless communications, and more specifically to a user equipment (UE) parameter update (UPU) procedure.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

A UPU procedure in a wireless communications system is used by unified data management (UDM) to update UE parameters, such as a routing indicator, default configured network slice selection assistance information (NSSAI), disaster roaming information, a mobile equipment (ME) routing indicator etc., which are collectively referred to as the UPU data. During the UPU procedure, the UDM requests the authentication server function (AUSF) to generate and provide a message authentication code (MAC) (identified as UPU-MAC-$I_{AUSF}$, which is derived from $K_{AUSF}$ for the inputs of the UPU data, the length of the UPU data, $Counter_{UPU}$ and length of $Counter_{UPU}$) for the UPU data protection.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

Some implementations of the method and apparatuses described herein may further include a UE for wireless communication to receive a non-access stratum (NAS) message that includes an indication of UPU header protection; compute a UPU message authentication code (MAC) using a UPU header as at least one input for UPU protection; and transmit an acknowledgement that indicates a UPU header verification is successful.

In some implementations of the method and apparatuses described herein, the UE determines to perform the UPU header verification; and computes the UPU MAC based at least in part on the determination to perform the UPU header verification. The UE computes the UPU MAC as UPU-MAC-$I_{AUSF}$ using the UPU header as the at least one input for the UPU protection. The UE determines that the UPU header verification is successful. The UE generates a MAC UPU-MAC-$I_{UE}$ that indicates the UPU header verification is successful. The UE determines successful verification of the UPU header protection; and transmits a verification indication to UDM via an access and mobility management function (AMF) that verification of the UPU header protection is successful. The UE receives a capability request as to whether the UE supports the UPU header protection; and transmits a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

Some implementations of the method and apparatuses described herein may further include a processor for wireless communication to receive a NAS message that includes an indication of UPU header protection; compute a UPU MAC using a UPU header as at least one input for UPU protection; and transmit an acknowledgement that indicates a UPU header verification is successful.

In some implementations of the method and apparatuses described herein, the processor determines to perform the UPU header verification; and computes the UPU MAC based at least in part on the determination to perform the UPU header verification. The processor computes the UPU MAC as UPU-MAC-$I_{AUSF}$ using the UPU header as the at least one input for the UPU protection. The processor determines that the UPU header verification is successful. The processor generates a MAC UPU-MAC-$I_{UE}$ that indicates the UPU header verification is successful. The processor determines successful verification of the UPU header protection; and transmits a verification indication to UDM via an AMF that verification of the UPU header protection is successful. The processor receives a capability request as to whether the UE supports the UPU header protection; and transmits a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

Some implementations of the method and apparatuses described herein may further include a method performed by a UE, the method including: receiving a NAS message that includes an indication of UPU header protection; computing a UPU MAC using a UPU header as at least one input for UPU protection; and transmitting an acknowledgement that indicates a UPU header verification is successful.

In some implementations of the method and apparatuses described herein, the method further comprising determining to perform the UPU header verification; and computing the UPU MAC based at least in part on the determination to perform the UPU header verification. The method further comprising computing the UPU MAC as UPU-MAC-$I_{AUSF}$ using the UPU header as the at least one input for the UPU protection. The method further comprising determining that the UPU header verification is successful. The method further comprising generating a MAC UPU-MAC-$I_{UE}$ that indicates the UPU header verification is successful. The method further comprising determining successful verification of the UPU header protection; and transmitting a verification indication to UDM via an AMF that verification of the UPU header protection is successful. The method further comprising receiving a capability request as to whether the UE supports the UPU header protection; and transmitting a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

Some implementations of the method and apparatuses described herein may further include a network equipment (NE) (e.g., UDM) for wireless communication to transmit a request to an AUSF to apply UPU header protection; and transmit at least one of a UPU transparent container or UPU header information to a UE, the at least one UPU transparent container or the UPU header information including an indication that a UPU header is protected.

In some implementations of the method and apparatuses described herein, the NE (e.g., UDM) transmits a capability request as to whether the UE supports the UPU header protection; and receives a capability response that the UE supports the UPU header protection. The NE transmits a capability request as to whether the UE supports the UPU header protection; receives a capability response that indicates whether the UE supports the UPU header protection; and saves information as to UE capability to support the UPU header protection. The NE determines to apply the UPU header protection. The request to the AUSF to apply the UPU header protection includes at least one of a first indication that the UPU header protection is required, or a second indication that a UPU header verification and acknowledgement is required. The NE sets an acknowledgement required indication that confirms the UE received and successfully verified UPU data and the UPU header information. The NE transmits a related indication of the UPU header protection to the UE, the related indication indicating the UE to compute a UPU MAC using a UPU header as at least one input for UPU protection. The related indication indicates the UE to compute the UPU MAC as UPU-MAC-$I_{AUSF}$ using the UPU header as the at least one input for the UPU protection. The NE generates the UPU transparent container with the indication that the UPU header protection is set in the UPU header. The NE determines to apply the UPU header protection; and includes one or more of a UPU data set type specific to the UPU header information, a length of a UPU data set specific to the UPU header information, and the UPU header information in UPU data transmitted to the UE that supports the UPU header protection. The UPU header information included in the UPU data provides for integrity protection of the UPU header information. The NE determines to apply the UPU header protection; and includes an indication in UPU header transmitted to the UE that the UPU header is protected as part of the UPU data.

Some implementations of the method and apparatuses described herein may further include a method performed by a (NE) (e.g., UDM), the method including: transmitting a request to an AUSF to apply UPU header protection; and transmitting at least one of a UPU transparent container or UPU header information to a UE, the at least one UPU transparent container or the UPU header information including an indication that a UPU header is protected.

In some implementations of the method and apparatuses described herein, the method further comprising transmitting a capability request as to whether the UE supports the UPU header protection; and receiving a capability response that the UE supports the UPU header protection. The method further comprising transmitting a capability request as to whether the UE supports the UPU header protection; receiving a capability response that indicates whether the UE supports the UPU header protection; and saving information as to UE capability to support the UPU header protection. The method further comprising determining to apply the UPU header protection. The request to the AUSF to apply the UPU header protection includes at least one of a first indication that the UPU header protection is required, or a second indication that a UPU header verification and acknowledgement is required. The method further comprising setting an acknowledgement required indication that confirms the UE received and successfully verified UPU data and the UPU header information. The method further comprising transmitting a related indication of the UPU header protection to the UE, the related indication indicating the UE to compute a UPU MAC using a UPU header as at least one input for UPU protection. The related indication indicates the UE to compute the UPU MAC as UPU-MAC-$I_{AUSF}$ using the UPU header as the at least one input for the UPU protection. The method further comprising generating the UPU transparent container with the indication that the UPU header protection is set in the UPU header. The method further comprising determining to apply the UPU header protection; and including one or more of a UPU data set type specific to the UPU header information, a length of a UPU data set specific to the UPU header information, and the UPU header information in UPU data transmitted to the UE that supports the UPU header protection. The UPU header information included in the UPU data provides for integrity protection of the UPU header information. The method further comprising determining to apply the UPU header protection; and including an indication in UPU header transmitted to the UE that the UPU header is protected as part of the UPU data.

Some implementations of the method and apparatuses described herein may further include a NE (e.g., AMF) for wireless communication to receive, from UDM, at least one of a UPU transparent container or UPU header information that includes a UPU header protection indication for a UE; and transmit, to the UE, the UPU transparent container or the UPU header information.

In some implementations of the method and apparatuses described herein, the NE (e.g., AMF) transmits the UPU transparent container or the UPU header information to the UE as a NAS message that includes the indication of the UPU header protection. The NE generates the UPU transparent container with UPU header including the UPU header protection indication if the transparent container is not received from the UDM and if it receives the UPU header protection indication information element.

Some implementations of the method and apparatuses described herein may further include a method performed by a NE (e.g., AMF), the method including: receiving, from UDM, at least one of a UPU transparent container or UPU header information that includes a UPU header protection indication for a UE; and transmitting, to the UE, the UPU transparent container or the UPU header information.

In some implementations of the method and apparatuses described herein, the method further comprising transmitting the UPU transparent container or the UPU header information to the UE as a NAS message that includes the indication of the UPU header protection. The method further comprising generating the UPU transparent container with UPU header including the UPU header protection indication if the transparent container is not received from the UDM and if it receives the UPU header protection indication information element.

BRIEF DESCRIPTION OF THE DRAWINGS

FIG. 10 illustrates a UE parameters update transparent container information element for UE parameters update data type, in accordance with aspects of the present disclosure.

FIG. 11 illustrates a UE parameters update header for UE parameters update data type, in accordance with aspects of the present disclosure.

FIG. 12 illustrates a UE parameters update transparent container information element for UE parameters update data type, in accordance with aspects of the present disclosure.

FIG. 13 illustrates a UE parameters update header for UE parameters update data type, in accordance with aspects of the present disclosure.

FIG. 14 illustrates a UE parameters update header for UE parameters update data type, in accordance with aspects of the present disclosure.

FIG. 15 illustrates UPU header enhancements, in accordance with aspects of the present disclosure.

FIG. 16 illustrates UPU header enhancements, with UE parameters update header for UE parameters update data type, in accordance with aspects of the present disclosure.

FIG. 17 illustrates a new UPU data type, in accordance with aspects of the present disclosure.

DETAILED DESCRIPTION

In a wireless communications system, a UPU procedure is used by UDM to update UE parameters, such as a routing indicator, default configured network slice selection assistance information (NSSAI), disaster roaming information, a ME routing indicator etc., which are collectively referred to as the UPU data. During the UPU procedure, the UDM requests the AUSF to generate and provide a MAC (identified as UPU-MAC-$I_{AUSF}$, which is derived from $K_{AUSF}$ for the inputs of the UPU data, the length of the UPU data, $Counter_{UPU}$ and length of $Counter_{UPU}$) for the UPU data protection. Further the UDM sends the UPU header, $Counter_{UPU}$, UPU data and UPU-MAC-$I_{AUSF}$ to the UE via the AMF. Given that the UPU header sent to the UE is not protected with any MAC for integrity protection, any intermediary (e.g., the AMF) can alter the UPU header bit value leading to UPU procedure failure. Notably, a lack of UPU header protection in the UPU procedure can lead to malicious alterations of UPU header values, which can result in UPU procedure failure.

Aspects of the disclosure are directed to implementations that provide several enhancements for UPU header protection during the UE parameter update procedure for the 3GPP 5G system. By utilizing the described techniques, the network (e.g., UDM, AUSF, via AMF) provides a UE with an indication that the network supports UPU header protection (e.g., and/or UPU header protection is applied). If the network supports UPU header protection, and if it is aware that a UE also supports UPU header protection, then the network determines to apply UPU header protection and then sends an indication to the UE that the network supports and applies UPU header protection. If the network supports UPU header protection, but is not aware that a UE also supports UPU header protection (e.g., if a related UE capability is not received from the UE in any earlier steps of a registration process), then the network determines not to apply the UPU header protection. If the UE if supports UPU header protection, and if it receives a UPU header protection related indication from the network, then the UE determines to use UPU header as one of the inputs in the MAC calculation (UPU-MAC-$I_{AUSF}$ same as AUSF) to verify the MAC (i.e., UPU-MAC-$I_{AUSF}$) received from the network. Further, a UE can also generate UPU-MAC-$I_{UE}$ with an acknowledgement that the UE has successfully received and verified the UPU header along with UPU data, and may send the related indication to the network.

Aspects of the present disclosure are described in the context of a wireless communications system.

Figure 1:
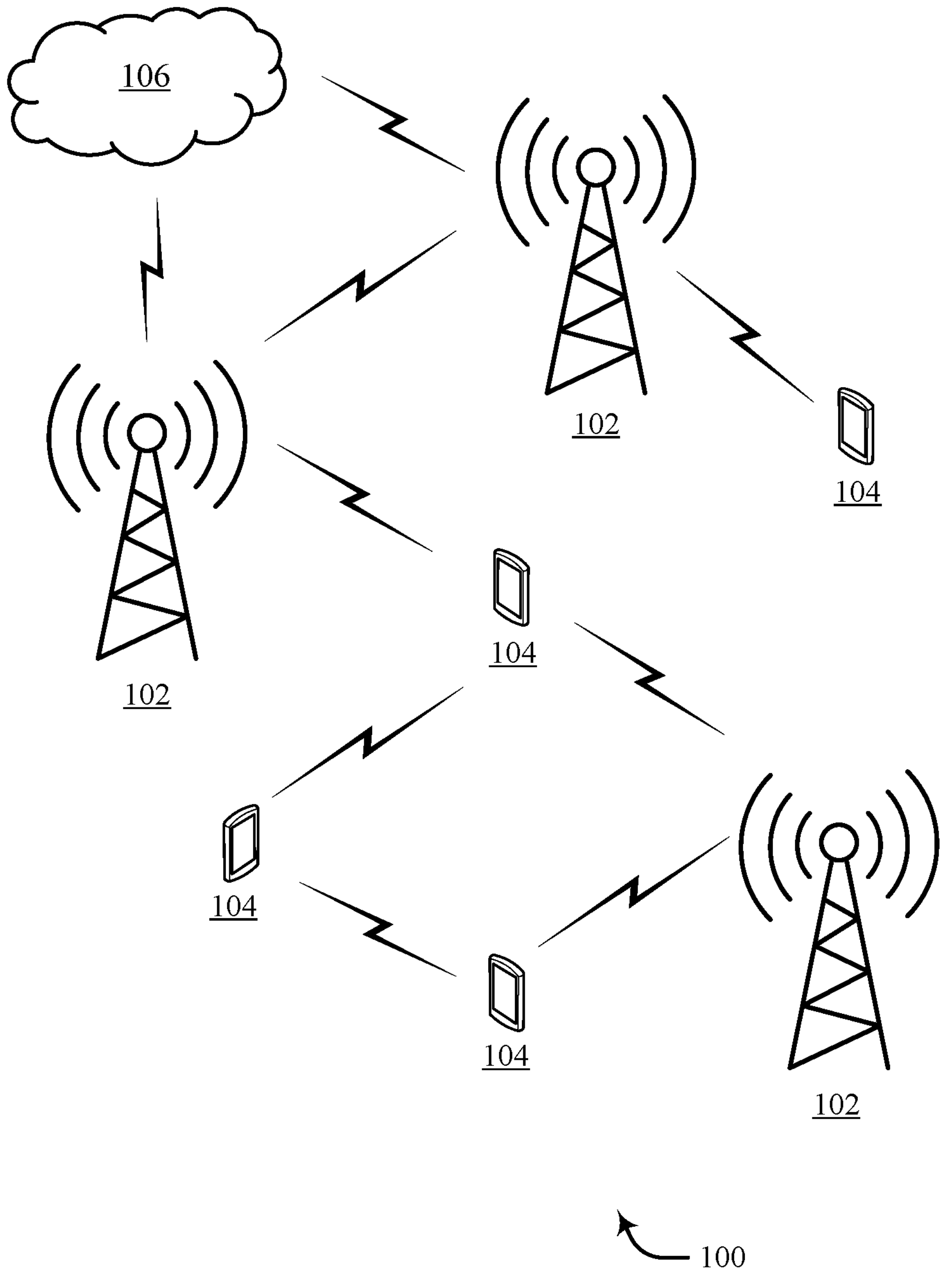
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit" signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UEs 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., μ=0, μ=1, μ=2, μ=3, μ=4) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., μ=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., μ=0), which includes 15 kHz subcarrier spacing; a second numerology (e.g., μ=1), which includes 30 kHz subcarrier spacing; and a third numerology (e.g., μ=2), which includes 60 kHz subcarrier spacing. FR2 may be associated with one or multiple numerologies (e.g., at least 2 numerologies). For example, FR2 may be associated with a third numerology (e.g., μ=2), which includes 60 kHz subcarrier spacing; and a fourth numerology (e.g., μ=3), which includes 120 kHz subcarrier spacing.

According to implementations, one or more of the NEs 102 and the UEs 104 are operable to implement various aspects of the techniques described with reference to the present disclosure. For example, a NE 102 (e.g., UDM) communicates (e.g., transmits) a request to an AUSF to apply UPU header protection, and transmits a UPU transparent container and/or UPU header information to a UE 104. The UPU transparent container and/or the UPU header information includes an indication that a UPU header is protected. The UE 104 receives a NAS message that includes an indication of the UPU header protection, computes a UPU MAC using a UPU header as at least one input for UPU protection, and transmits an acknowledgement that indicates a UPU header verification is successful. In another example, a NE 102 (e.g., AMF) receives, from UDM, at least one of a UPU transparent container or UPU header information that includes an indication of UPU header protection for a UE 104, and transmits, to the UE, the UPU transparent container or the UPU header information With reference to UPU procedure, the UDM sends to a UE (via AMF), a UE parameters update transparent container which includes the UPU header to indicate various information, such as an acknowledgement (ACK) value, which indicates whether an acknowledgement is requested from the UE or not (i.e., an acknowledgment for the successful reception of a UPU data list); a re-registration (REG) value, which indicates whether a re-registration is requested from the UE or not, and etc.:

Acknowledgement (ACK) value (octet 4, bit 2)
- 0 acknowledgement not requested, 1 acknowledgement requested Re-registration (REG) value (octet 4, bit 3)
- 0 re-registration not requested, 1 re-registration requested Also noting that if the UDM sends individual information elements (IEs) related to the UPU based on the received information (such as in this case), and if the AMF supports, the UDM can generate and send the 'UE parameters update transparent container' to the UE.

With reference to the 'UE parameters update transparent container', a UPU transparent container is sent from UDM to a UE (via AMF). For example, a UE parameters update transparent container information element for UE parameters update data type with a value "0", as shown in FIG. 10. Along with an example of a UE parameters update header for UE parameters update data type with value "0", as shown in FIG. 11.

In another example, a UPU transparent container is sent from a UE to UDM (via AMF). For example, a UE parameters update transparent container information element for UE parameters update data type with value "1", as shown in FIG. 12. Along with an example of a UE parameters update header for UE parameters update data type with value "1", as shown in FIG. 13.

With reference to performing a UE parameters update capability check, this previous description uses a UPU header as additional input in a UPU-MAC-$I_{AUSF}$ calculation to provide UPU header protection, but this need to be supported by both a UE and the network, which can be made possible in new releases of 5G (e.g., Rel.19 and on), but the solution is not complete. For example, limitations of legacy UEs (i.e., older release UE) and legacy network do not support this enhancement of using a UPU header as an additional input in the UPU-MAC-$I_{AUSF}$ calculation at the network side and related verification at the UE side. The solution does not explain how the UE capability and network capability about UPU header protection, if supported in a new release feature, is exchanged between the UE and the network. Therefore, applying UPU header protection cannot be implemented in a scenario that includes legacy UE and/or legacy network. For example, ff the network supports UPU header protection, UDM can send UPU-MAC-$I_{AUSF}$ which was computed using a UPU header as one of the inputs, but if the receiving UE is a legacy UE that does not support UPU header protection, the UE will generate UPU-MAC-$I_{AUSF}$ without using UPU header as an input. The computed UPU-MAC-$I_{AUSF}$ will not match the received UPU-MAC-$I_{AUSF}$, and verification of UPU-MAC-$I_{AUSF}$ will therefore fail.

With reference to a previous contribution related to protection of UPU header, the UE has informed the UDM that it supports UPU header information in the UPU Data. If the UE supports receiving UPU header information in the UPU data, the UDM shall further include the UPU header information in the UPU data. Inclusion of the UPU header information in the UPU data provides integrity protection of that information. If the UPU data contains the UPU header information, then the UE shall use such information as the UPU header and act accordingly.

However, This solution attempts to avoid AUSF impact by placing the 'UPU header' inside of the 'UPU data' to make the AUSF generate UPU-MAC-$I_{AUSF}$ by using the existing inputs, while indirectly protecting the UPU header, given that it is inside UPU data and results in UPU-MAC-$I_{AUSF}$ generation. In this solution, the UE informs the network that it supports 'UPU header information in the UPU data', but the network is not providing any of its UPU header protection capability to the UE. If the UE is connected to a 5G system with legacy AUSF and UDM (i.e., older release systems), then the network (i.e., AUSF, UDM) cannot protect the UPU header. Even if the UE informs the network about its capability to support UPU header protection in UPU data, the legacy network function cannot understand this new capability of a UE. Further, when the UE receives a UPU-MAC-$I_{AUSF}$ from the network, the UE will assume that UPU header is protected in the UPU data, and it will compute UPU-MAC-$I_{AUSF}$ by placing 'UPU header' in 'UPU data'. However, the UE computed UPU-MAC-$I_{AUSF}$ will not match the receivednetwork computed UPU-MAC-$I_{AUSF}$ and the verification of UPU-MAC-$I_{AUSF}$ will fail.

In aspects of this disclosure, described implementations provide several enhancements for UPU header protection during the UE parameter update procedure for the 3GPP 5G system:

- The network (e.g., UDM, AUSF, via AMF) provides a UE with an indication that the network supports UPU header protection (e.g., and/or UPU header protection is applied).
- If the network supports UPU header protection, and if it is aware that a UE also supports UPU header protection, then the network determines to apply UPU header protection and then sends an indication to the UE that the network supports and applies UPU header protection.
- If the network supports UPU header protection, but is not aware that a UE also supports UPU header protection (e.g., if a related UE capability is not received from the LIE in any earlier steps of a registration process), then the network determines not to apply the UPU header protection.
- If the UE if supports UPU header protection, and if it receives a UPU header protection related indication from the network, then the UE determines to use UPU header as one of the inputs in the MAC calculation (UPU-MAC-$I_{AUSF}$ same as AUSF) to verify the MAC (i.e., UPU-MAC-$I_{AUSF}$) received from the network.
- Further, a UE can also generate UPU-MAC-$I_{UE}$ with an acknowledgement that the UE has successfully received and verified the UPU header along with UPU data, and may send the related indication to the network.

In aspects of this disclosure, an implementation informs of network UPU header protection capability and applies UPU header protection (with AUSF impact). This describes how the network capability to support the UPU header protection is indicated to a UE, and how the UPU header protection is uniformly applied and verified between the network and the UE during the UPU procedure.

Figure 2:
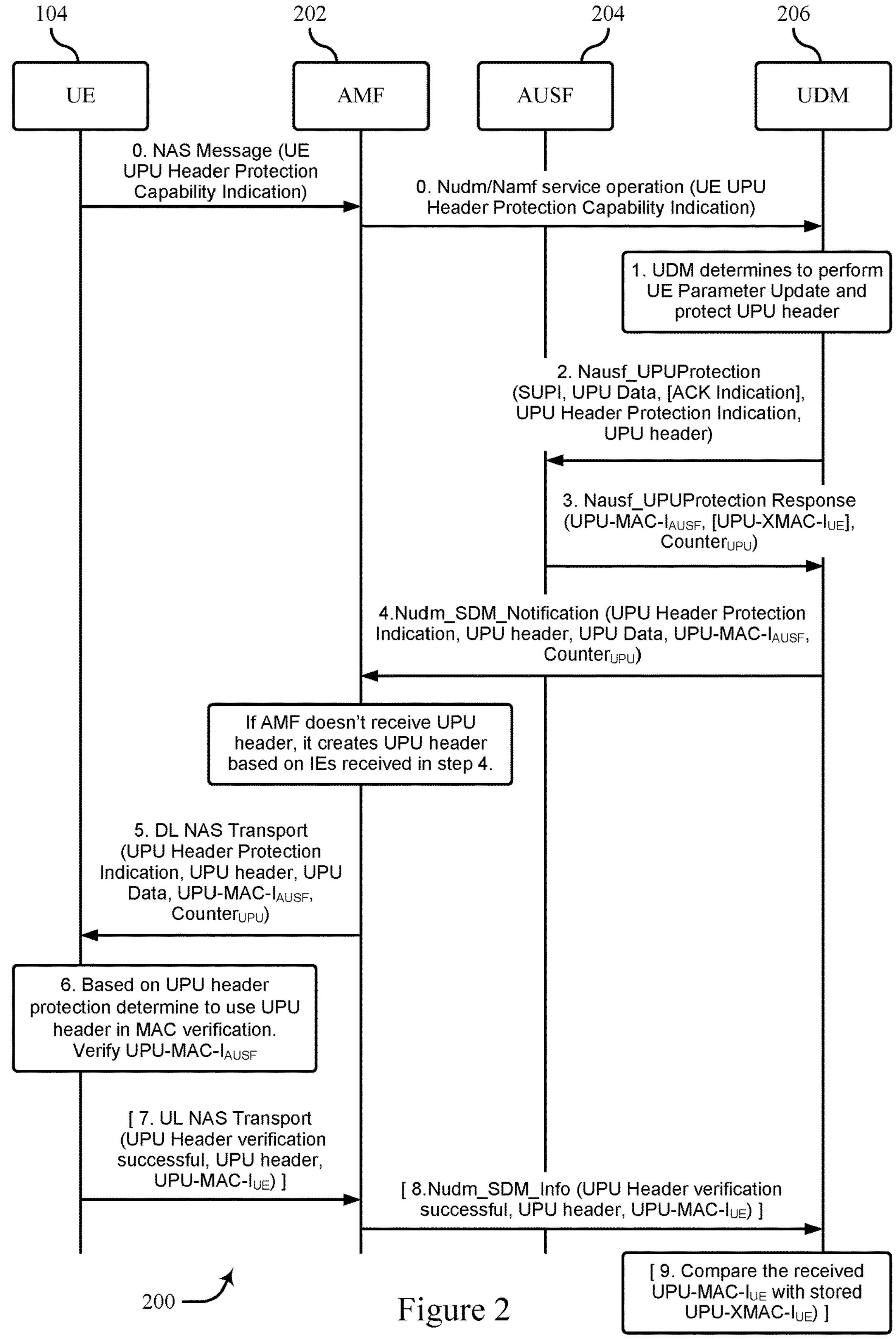
FIG. 2 illustrates an example of UPU procedure enhancements to support UPU header protection (as standalone IE) and related network capability indication, in accordance with aspects of the present disclosure.

FIG. 2 illustrates an example 200 of UPU procedure enhancements to support UPU header protection (as standalone IE) and related network capability indication, in accordance with aspects of the present disclosure.

At step 0, a UE 104 that supports UPU header protection sends to AMF 202 in any NAS/N1 message, an indication as to a capability of the UE to support UPU header protection. The AMF can send or forward the received indication about the UE's capability to support UPU header protection to the UDM 206 in any Nudm service operation message or in any Namf service operation message.

At step 1, the UDM determines to perform the UPU using the control plane procedure while the UE is registered to the 5G system. If the final consumer of any of the UE parameters to be updated (e.g., the updated routing ID data) is the USIM, the UDM protects these parameters using a secured packet mechanism to update the parameters stored on the USIM. The UDM then prepares the UE parameters update data (UPU Data) by including the parameters protected by the secured packet, if any, as well as any UE parameters for which a final consumer is the ME. If the UDM supports UPU header protection, and if the UDM received earlier (during any authentication or registration procedure, or subscription data management) for any UE, the UE capability indication that the UE supports UPU header protection, then the UDM determines to apply UPU header protection.

At steps 2 and 3, the UDM can invoke a Nausf_UPUProtection service operation message by including the UPU Data, to the AUSF 204 to get UPU-MAC-$I_{AUSF}$ and $Counter_{UPU}$. The UDM can select the AUSF that holds the latest $K_{AUSF}$ of the UE. If the UDM determines that the UE is to acknowledge the successful security check of the received UPU data, then the UDM can include the ACK indication in the Nausf_UPUProtection service operation message to signal that it also needs the expected UPU-XMAC-$I_{UE}$. If the UDM determines that the UPU header should be protected by the AUSF, the UDM also includes a UPU header protection indication, and may include the UPU header in the Nausf_UPUProtection service operation message to signal that AUSF needs to use UPU header during the generation of UPU-MAC-$I_{AUSF}$. The inclusion of UE parameters update header in the calculation of UPU-MAC-$I_{AUSF}$ allows the UE to verify that it has not been tampered by any intermediary.

The details of the CounterUPU are described below with reference to FIG. 3. The inclusion of UPU data in the calculation of UPU-MAC-$I_{AUSF}$ allows the UE to verify that it has not been tampered by any intenrmediary. The expected UPU-XMAC-$I_{UE}$ allows the UDM to verify that the UE received the UPU data correctly. The AUSF calculates the UPU-MAC-$I_{AUSF}$ as described below using UE specific home key ($K_{AUSF}$) along with the UPU data received from a requester network function (NF) and UPU Header (if received or self-generated based on the UPU header protection indication) and delivers the UPU-MAC-$I_{AUSF}$ and $Counter_{UPU}$ to the requester NF. If the ACK indication input is present, then the AUSF also computes the UPU-XMAC- $I_{UE}$ and returns the computed UPU-XMAC-$I_{UE}$ in the response. As an alternative, or in addition, the expected UPU-XMAC-$I_{UE}$ computation can also include a UPU header verification acknowledgement that 'UE verified the UPU header successfully', which allows the UDM to verify that the UE received the UPU header correctly.

With reference to an enhanced UPU-MAC-$I_{AUSF}$ generation function, the following parameters are used by the AUSF to form the input S to the key derivation function (KDF) when deriving a UPU-MAC-$I_{AUSF}$ from $K_{AUSF}$. The FC=0x7B; PO=UE parameters update data (i.e., UE parameters update list (starting from octet 23)); L0=length of UE parameters update data; P1=CounterUPU; L1=length of CounterUPU; P2=UPU header; L2=length of UPU header; and the input key Key is $K_{AUSF}$. The UPU-MAC-$I_{AUSF}$ is identified with the 128 least significant bits of the output of the KDF.

With reference to an enhanced UPU-MAC-$I_{UE}$/UPU-XMAC-$I_{UE}$ generation function, the following parameters are used by the AUSF to form the input S to the KDF when deriving a UPU-MAC-$I_{UE}$/UPU-XMAC-$I_{UE}$ from $K_{AUSF}$. The FC=0x7C; PO=0x01 (UPU acknowledgement: verified the UE parameters update data successfully); L0=length of UPU acknowledgement (i.e., 0x00 0x01); P1=CounterUPU; L1=length of CounterUPU; P0 0x02 (UPU header acknowledgement: verified the UE parameters update header successfully); L0=length of UPU header acknowledgement (i.e., 0x00 0x01); and the input key Key can be $K_{AUSF}$. The UPU-MAC-$I_{UE}$/UPU-XMAC-$I_{UE}$ is identified with the 128 least significant bits of the output of the KDF.

At step 4, The UDM invokes a Nudm_SDM_Notification service operation, which includes the UPU transparent container if the AMF supports UPU transparent container, or includes individual IEs comprising the UPU header protection indication, UPU header, UE parameters update data, UPU-MAC-$I_{AUSF}$, and $Counter_{UPU}$ within the access and mobility subscription data. If the UDM requests an acknowledgement, the it temporarily stores the expected UPU-XMAC-$I_{UE}$. If the UDM includes UPU transparent container, the UPU header can include a UPU header protection (support/enabled) related indication as shown below.

At step 5, based on receiving the Nudm_SDM_Notification message, the AMF sends a DL NAS transport message to the served UE. The AMF includes in the DL NAS transport message, the transparent container if received from the UDM in step 4. Otherwise, if the UDM provided individual IEs in step 4, then the AMF constructs a UPU transparent container by including the UPU header and the UPU header protection indication (if those information elements (IEs) are received in step 4 from the UDM).

At step 6, based on receiving the DL NAS transport message, the UE calculates the UPU-MAC-$I_{AUSF}$ in the same way as the AUSF (as shown in steps 2-3) on the received UE parameters update data, UPU header (if UPU header protection is indicated and received in step 5), and the $Counter_{UPU}$, and verifies whether it matches the UPU-MAC-$I_{AUSF}$ value received within the UPU transparent container in the DL NAS transport message. If the verification of UPU-MAC-$I_{AUSF}$ is successful and the UPU Data contains any parameters that are protected by secured packet, the ME can forward the secured packet to the USIM using given procedures. If the verification of UPU-MAC-$I_{AUSF}$ is successful and the UPU data contains any parameters that are not protected by secure packet, the ME can update its stored parameters with the received parameters in UDM updata data.

At step 7, if the UDM has requested an acknowledgement from the UE and (i) the UE has successfully verified and updated the UE parameters update data provided by the UDM and (ii) if the UE has successfully verified the UE parameters update header provided by the UDM, then the UE can send the UL NAS transport message to the serving AMF. The UE then generates the UPU-MAC-$I_{UE}$ (as specified in steps 2-3 same as AUSF) and includes the generated UPU-MAC-$I_{UE}$ in a transparent container in the UL NAS transport message. The UE can also send the UPU header verification successful indication or information in a transparent container in the UL NAS transport message.

Additionally, if the UE sends UPU transparent container, the UE can indicate in the UPU header whether 'UPU header protection verification is successful/UPU header protected by UE' or 'UPU header protection verification is not successful/UPU header not protected by UE' accordingly, as shown below. Alternatively, if the UE supports UPU header protection, and if the UE computed UPU-MAC-$I_{UE}$ and received UPU-MAC-$I_{AUSF}$ does not match, irrespective of whether the UE received a UPU header protection indication or not from the UDM, the UE sends UPU header verification not successful, and sets a related bit in the UPU header as shown below, and the response in step 7 includes UPU header verification not successful.

At step 8, if a transparent container with the UPU-MAC-$I_{UE}$ and UPU header verification successful indication or information was received in the UL NAS transport message, the AMF sends a Nudm_SDM_Info request message with the transparent container to the UDM. Alternatively, if a transparent container with the UPU-MAC-$I_{UE}$ and a UPU header verification is not successful indication or information was received in the UL NAS transport message, the AMF can send a Nudm_SDM_Info request message with the transparent container to the UDM.

At step 9, if the UDM indicated that the UE is to acknowledge the successful security check of the received UE parameters updateData, and if the UDM receives UPU header verification successful indication or information, then the UDM compares the received UPU-MAC-$I_{UE}$ with the expected UPU-XMAC-$I_{UE}$ that the UDM stored temporarily in step 4. Alternatively, if the UDM receives UPU header verification not successful indication or information in step 9, then the UDM can record the information and retry the UPU procedure based on local policy. If the UDM supports Home triggered authentication, the UDM based on its local policy may determine to trigger a primary authentication to refresh the UPU counter based on the value of the counter received in step 3.

An example illustrates a UE parameters update header for UE parameters update data type with value "0" (Network to UE), as shown in FIG. 14, with UE parameters update transparent container information element. with:

Option 1:
- UPU Header Protection Indication (UPU HPI) value (Octet 4, bit 4)
- 0—UPU header not protected or UPU header protection not supported/enabled
- 1—UPU header protected or UPU header protection supported/enabled Option 2:
- UPU Header Protection Indication (UPU HPI) value (Octet 4, bit x)—A common definition to cover both 'network to UE' and 'UE to network case' (shown in two examples below, respectively).
- 0—UPU header protected by the network
- 1—UPU header protected by the UE An alternative example illustrates UPU header Enhancements (to be sent from network to UE), as shown in FIG. 15.

Another example illustrates UPU header Enhancements (to be sent from UE to network), with UE parameters update header for UE parameters update data type with value "1" (UE to Network), as shown in FIG. 16, with:

Option 3:

UPU Header Protection Indication (UPU HPI) value (Octet 4, bit 2)

0—UPU header not protected by the UE or UPU header verification failed at UE

1—UPU header protected by the UE or UPU header verification successful at UE

In aspects of this disclosure, an implementation informs of network UPU header protection capability and applies UPU header protection (without AUSF impact). This describes how the network capability to support the UPU header protection is indicated to a UE, and how the UPU header protection is uniformly applied and verified between the network and the UE during the UE parameter Update (UPU) procedure without impacts to the AUSF.

Figure 3:
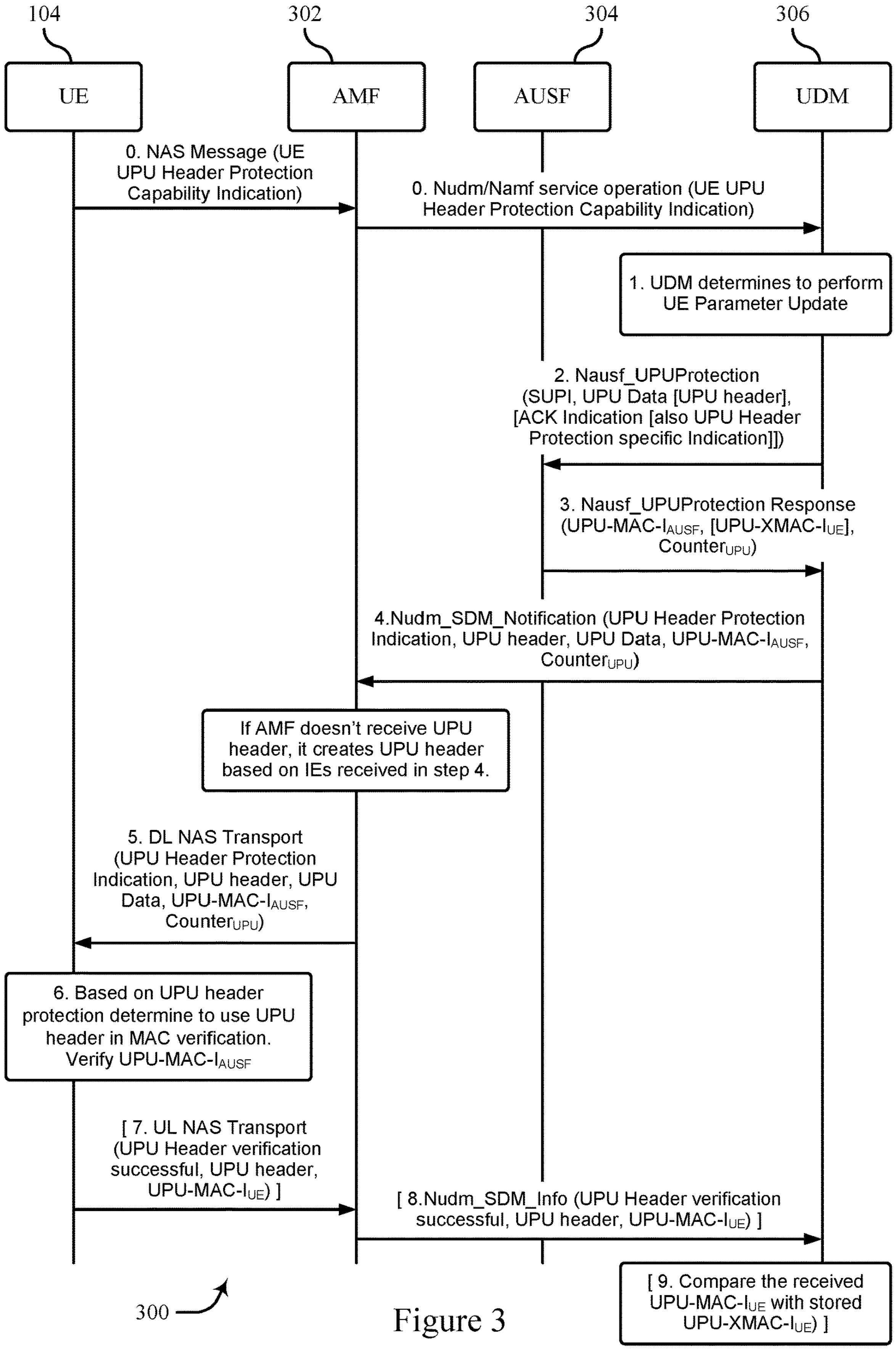
FIG. 3 illustrates an example of UPU procedure enhancements to support UPU header protection as part of UPU data and related network capability indication, in accordance with aspects of the present disclosure.

FIG. 3 illustrates an example 300 of UPU procedure enhancements to support UPU header protection as part of UPU data and related network capability indication, in accordance with aspects of the present disclosure.

At step 0, the UE 104 informs the UDM 306 (e.g., during authentication or a registration procedure) that it supports UPU header information in the UPU data or the UE's UPU header protection capability indication.

At step 1, the UDM determines to perform the UPU using the control plane procedure while the UE is registered to the 5G system. If the final consumer of any of the UE parameters to be updated (e.g., the updated routing ID data) is the USIM, the UDM protects these parameters using a secured packet mechanism to update the parameters stored on the USIM. The UDM can then prepare the UE parameters update data (UPU Data) by including the parameters protected by the secured packet, if any, as well as any UE parameters for which a final consumer is the ME. If the UE supports receiving UPU header information in the UPU data, or if the UE supports the capability of UPU header protection, the UDM can further include the UPU header information in the UPU data (as shown below). If the UDM supports UPU header protection, and if the UDM received earlier (during any authentication or registration procedure, or subscription data management) for any UE, the UE capability indication that the UE supports 'UPU header protection (as part of UPU data)' or 'UPU header information in the UPU data', then the UDM determines to apply UPU header protection. Inclusion of the UPU header information in the UPU data provides integrity protection of that information.

At steps 2 and 3, the UDM invokes Nausf_UPUProtection service operation message by including the UPU data to the AUSF 304 to get UPU-MAC-$I_{AUSF}$ and $Counter_{UPU}$. The UDM can select the AUSF that holds the latest $K_{AUSF}$ of the UE. If the UDM determines that the UE is to acknowledge the successful security check of the received UPU data, then the UDM can include the ACK indication in the Nausf_UPUProtection service operation message to signal that it also needs the expected UPU-XMAC-$I_{UE}$, as specified. Alternatively, if the UDM determines that the UE is to acknowledge the successful security check of the received UPU data and UPU header, then the UDM can include the ACK indication (specific to the case of both UPU data and UPU header successful security check) in the Nausf_UPUProtection service operation message to signal that it also needs the expected UPU-XMAC-$I_{UE}$ for this case. The details of the $Counter_{UPU}$ is described below. The inclusion of UPU data in the calculation of UPU-MAC-$I_{AUSF}$ allows the UE to verify that it has not been tampered by any intermediary. The expected UPU-XMAC-$I_{UE}$ allows the UDM to verify that the UE received the UPU data correctly.

With reference to UE parameters update counter ($Counter_{UPU}$), the AUSF and the UE associates a 16-bit counter, $Counter_{UPU}$, with the key $K_{AUSF}$. The UE initialize the $Counter_{UPU}$ to 0x00 0x00 when the newly derived $K_{AUSF}$ is stored. The UE stores the UPU counter. If the USIM supports both 5G parameters storage and 5G parameters extended storage, then $Counter_{UPU}$ will be stored in the USIM. Otherwise, $Counter_{UPU}$ is stored in the non-volatile memory of the ME. To generate the UPU-MAC-$I_{AUSF}$, the AUSF uses the $Counter_{UPU}$. The $Counter_{UPU}$ can be incremented by the AUSF for every new computation of the UPU-MAC-$I_{AUSF}$. The $Counter_{UPU}$ is used as freshness input into UPU-MAC-$I_{AUSF}$ and UPU-MAC-$I_{UE}$ derivations as described above, to mitigate the replay attack. The AUSF sends the value of the $Counter_{UPU}$ (used to generate the UPU-MAC-$I_{AUSF}$) along with the UPU-MAC-$I_{AUSF}$ to the UE. The UE only accepts a $Counter_{UPU}$ value that is greater than a stored $Counter_{UPU}$ value. The UE then updates the stored $Counter_{UPU}$ with the received $Counter_{UPU}$, only if the verification of the received UPU-MAC-$I_{AUSF}$ is successful. The UE uses the $Counter_{UPU}$ received from the UDM when deriving the UPU-MAC-$I_{UE}$ for the UE parameters update data acknowledgement.

The AUSF and the UE maintains the $Counter_{UPU}$ for the lifetime of the $K_{AUSF}$. The AUSF that supports the UE parameters update using control plane procedure initializes the $Counter_{UPU}$ to 0x00 0x01 when the newly derived $K_{AUSF}$ is stored. The AUSF can set the $Counter_{UPU}$ to 0x00 0x02 after the first calculated UPU-MAC-$I_{AUSF}$, and monotonically increment it for each additional calculated UPU-MAC-$I_{AUSF}$. The UPU Counter value of 0x00 0x00 will not be used to calculate the UPU-MAC-$I_{AUSF}$ and UPU-MAC-$I_{UE}$. The AUSF suspends the UE parameters update protection service for the UE if the $Counter_{UPU}$ associated with the $K_{AUSF}$ of the UE is about to wrap around. When a fresh $K_{AUSF}$ is generated for the UE, the $Counter_{UPU}$ at the AUSF is reset to 0x00 0x01 as defined above and the AUSF resumes the UE parameters update protection service for the UE.

With reference to enhanced UPU-MAC-$I_{AUSF}$ generation function, the following parameters are used by the AUSF to form the input S to the KDF when deriving a UPU-MAC-$I_{AUSF}$ from $K_{AUSF}$. The FC=0x7B; P0=UE parameters update data (i.e., UE parameters update list, (starting from octet 23)) and UPU header; L0=length of UE parameters update data; P1 CounterUPU; L1=length of CounterUPU; and the input key Key is $K_{AUSF}$. The UPU-MAC-$I_{AUSF}$ is identified with the 128 least significant bits of the output of the KDF.

With reference to enhanced UPU-MAC-$I_{UE}$/UPU-XMAC-$I_{UE}$ generation function, the following parameters are used by the AUSF to form the input S to the KDF when deriving a UPU-MAC-$I_{UE}$/UPU-XMAC-$I_{UE}$ from $K_{AUSF}$. The FC=0x7C; P0 0x02 (UPU acknowledgement: verified the UE parameters update data successfully and verified the UE parameters update header successfully); L0=length of UPU acknowledgement (i.e. 0x00 0x02); P1=CounterUPU; L1=length of CounterUPU; and the input key Key is $K_{AUSF}$. The UPU-MAC-$I_{UE}$/UPU-XMAC-$I_{UE}$ is identified with the 128 least significant bits of the output of the KDF.

At step 4, the UDM can invoke Nudm_SDM_Notification service operation, which includes the UPU transparent container if the AMF supports UPU transparent container, or includes individual IEs comprising the UE parameter update header (UPU header) protection indication, UPU header, UE parameters update data, UPU-MAC-$I_{AUSF}$, $Counter_{UPU}$ within the access and mobility subscription data. If the UDM requests an acknowledgement, it shall temporarily store the expected UPU-XMAC-$I_{UE}$. Alternatively, a UE parameter update header (UPU header) protection indication can be called as UPU data with UPU header or UPU header in UPU data protection indication.

At step 5, based on receiving the Nudm_SDM_Notification message, the AMF 302 can send a DL NAS transport message to the served UE. The AMF can include in the DL NAS transport message the transparent container if received from the UDM in step 4. Otherwise, if the UDM provided individual IEs in step 4, then the AMF can construct a UPU transparent container by including the UPU header and the UPU header protection indication (if those information elements (IEs) are received in step 4 from the UDM).

At step 6, based on receiving the DL NAS transport message, the UE can calculate the UPU-MAC-$I_{AUSF}$ in the same way as the AUSF (as shown in steps 2-3) on the received UE parameters update data and UPU header (if UPU header protection is indicated in the received step 5 and if the UE supports UPU header protection capability which is described in step 0), and the $Counter_{UPU}$ and verify whether it matches the UPU-MAC-$I_{AUSF}$ value received within the UPU transparent container in the DL NAS transport message. If the verification of UPU-MAC-$I_{AUSF}$ is successful and the UPU data contains any parameters that is protected by secured packet, the ME shall forward the secured packet to the USIM using given procedures. If the verification of UPU-MAC-$I_{AUSF}$ is successful and the UPU data contains any parameters that are not protected by secure packet, the ME shall update its stored parameters with the received parameters in UDM updata data. If the UPU data contains the UPU header information, then the UE shall use such information as the UPU header and act accordingly.

At step 7, if the UDM has requested an acknowledgement from the UE and (i) the UE has successfully verified and updated the UE parameters update data provided by the UDM and (ii) if the UE has successfully verified the UE parameters update header provided by the UDM, then the UE can send the UL NAS transport message to the serving AMF. The UE can generate the UPU-MAC-$I_{UE}$ (as shown in step 2-3 same as AUSF) and include the generated UPU-MAC-$I_{UE}$ in a transparent container in the UL NAS transport message. The UE can also send the UPU header verification successful indication or information in a transparent container in the UL NAS transport message. Additionally, the UE if sends UPU transparent container, the UE can indicate in the UPU header whether 'UPU header protection verification is successful or UPU header protected by UE' or 'UPU header protection verification is not successful or UPU header not protected by UE', accordingly as shown above. Alternatively, if the UE supports UPU header protection, and if UE computed UPU-MAC-$I_{UE}$ and received UPU-MAC-$I_{AUSF}$ does not match, irrespective of if the UE received UPU header protection indication is received or not from the UDM, the UE sends UPU header verification not successful, and sets a related bit in the UPU header as shown above, and the response in step 7 includes UPU header verification not successful.

At step 8, if a transparent container with the UPU-MAC-$I_{UE}$ and UPU header verification successful indication or information was received in the UL NAS transport message, the AMF can send a Nudm_SDM_Info request message with the transparent container to the UDM. Alternatively, if a transparent container with the UPU-MAC-$I_{UE}$ and UPU header verification not successful indication or information was received in the UL NAS transport message, the AMF can send a Nudm_SDM_Info request message with the transparent container to the UDM.

At step 9, if the UDM indicated that the UE is to acknowledge the successful security check of the received UE parameters update data, and if the UDM receives UPU header verification successful indication or information, then the UDM shall compare the received UPU-MAC-$I_{UE}$ with the expected UPU-XMAC-$I_{UE}$ that the UDM stored temporarily in step 4. Alternatively, if the UDM receives UPU header verification not successful indication or information in step 9, then the UDM can record the information and retry the UPU procedure based on local policy. If the UDM supports Home triggered authentication, the UDM based on its local policy may determine to trigger a primary authentication to refresh the UPU counter based on the value of counter received in step 3.

An example illustrates a UE parameters update list which includes UPU header with the new data type specific to the UPU header information and a length information related to the UPU header which is included as part of the UPU data (i.e., UE parameter update list) as a new UPU data type, as shown in FIG. 17.

Figure 4:
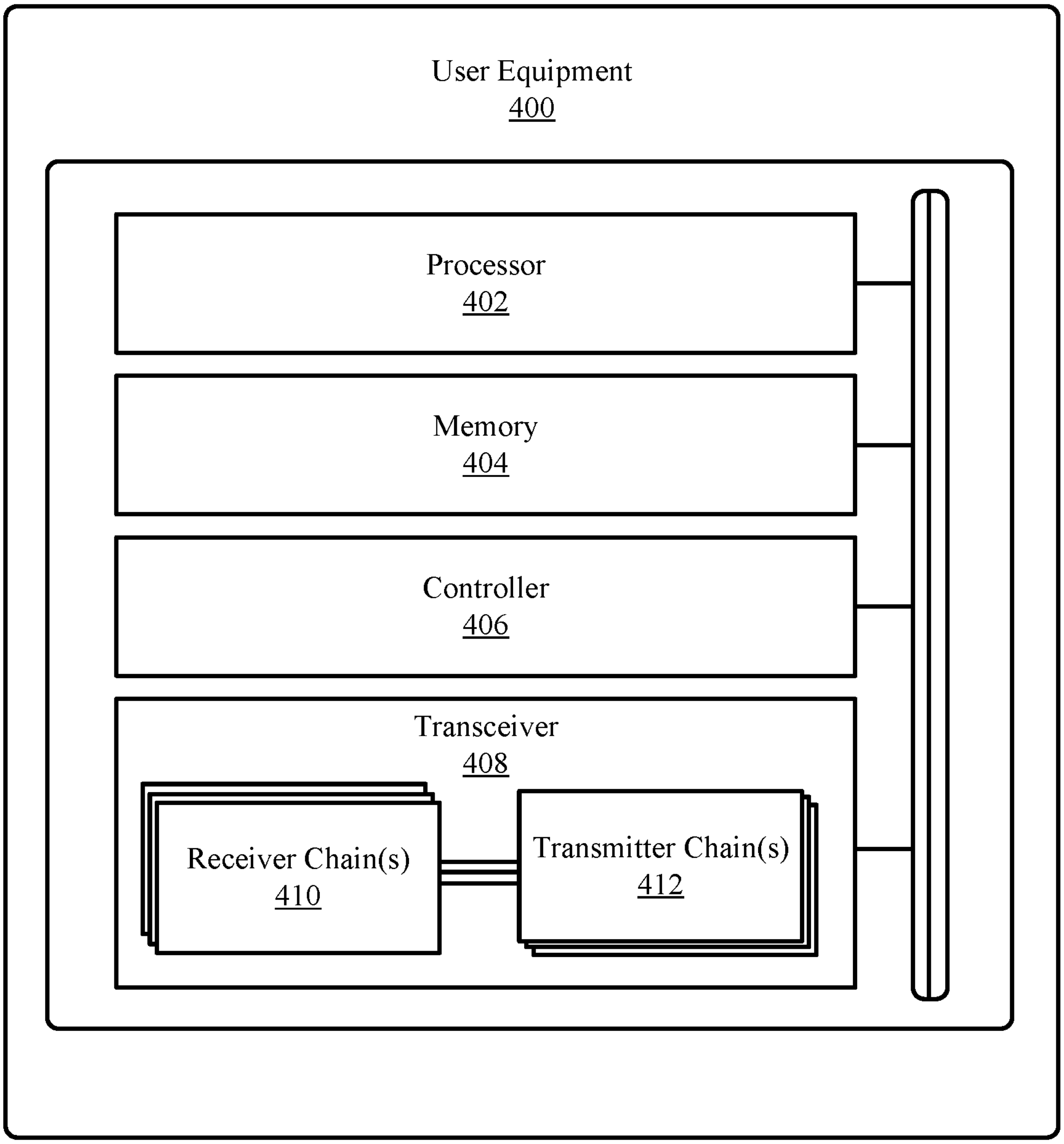
FIG. 4 illustrates an example of a UE in accordance with aspects of the present disclosure.

FIG. 4 illustrates an example of a UE 400 in accordance with aspects of the present disclosure. The UE 400 may include a processor 402, a memory 404, a controller 406, and a transceiver 408. The processor 402, the memory 404, the controller 406, or the transceiver 408, or various combinations thereof or various components thereof may be examples of means for performing various aspects of the present disclosure as described herein. These components may be coupled (e.g., operatively, communicatively, functionally, electronically, electrically) via one or more interfaces.

The processor 402, the memory 404, the controller 406, or the transceiver 408, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 402 may include an intelligent hardware device (e.g., a general-purpose processor, a DSP, a CPU, an ASIC, an FPGA, or any combination thereof). In some implementations, the processor 402 may be configured to operate the memory 404. In some other implementations, the memory 404 may be integrated into the processor 402. The processor 402 may be configured to execute computer-readable instructions stored in the memory 404 to cause the UE 400 to perform various functions of the present disclosure.

The memory 404 may include volatile or non-volatile memory. The memory 404 may store computer-readable, computer-executable code including instructions when executed by the processor 402 cause the UE 400 to perform various functions described herein. The code may be stored in a non-transitory computer-readable medium such as the memory 404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 402 and the memory 404 coupled with the processor 402 may be configured to cause the UE 400 to perform one or more of the functions described herein (e.g., executing, by the processor 402, instructions stored in the memory 404). For example, the processor 402 may support wireless communication at the UE 400 in accordance with examples as disclosed herein. The UE 400 may be configured to or operable to support a means for receiving a NAS message that includes an indication of UPU header protection; computing a UPU MAC using a UPU header as at least one input for UPU protection; and transmitting an acknowledgement that indicates a UPU header verification is successful.

Additionally, the UE 400 may be configured to support any one or combination of the method further comprising determining to perform the UPU header verification; and computing the UPU MAC based at least in part on the determination to perform the UPU header verification. The method further comprising computing the UPU MAC as UPU-MAC-$I_{AUSF}$ using the UPU header as the at least one input for the UPU protection. The method further comprising determining that the UPU header verification is successful. The method further comprising generating a MAC UPU-MAC-$I_{UE}$ that indicates the UPU header verification is successful. The method further comprising determining successful verification of the UPU header protection; and transmitting a verification indication to UDM via an AMF that verification of the UPU header protection is successful. The method further comprising receiving a capability request as to whether the UE supports the UPU header protection; and transmitting a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

Additionally, or alternatively, the UE 400 may support at least one memory and at least one processor coupled with the at least one memory and configured to cause the UE to: receive a NAS message that includes an indication of UPU header protection; compute a UPU MAC using a UPU header as at least one input for UPU protection; and transmit an acknowledgement that indicates a UPU header verification is successful.

Additionally, the UE 400 may be configured to support any one or combination of the at least one processor is configured to cause the UE to determine to perform the UPU header verification; and compute the UPU MAC based at least in part on the determination to perform the UPU header verification. The at least one processor is configured to cause the UE to compute the UPU MAC as UPU-MAC-$I_{AUSF}$ using the UPU header as the at least one input for the UPU protection. The at least one processor is configured to cause the UE to determine that the UPU header verification is successful. The at least one processor is configured to cause the UE to generate a MAC UPU-MAC-$I_{UE}$ that indicates the UPU header verification is successful. The at least one processor is configured to cause the UE to determine successful verification of the UPU header protection; and transmit a verification indication to UDM via an AMF that verification of the UPU header protection is successful. The at least one processor is configured to cause the UE to receive a capability request as to whether the UE supports the UPU header protection; and transmit a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

The controller 406 may manage input and output signals for the UE 400. The controller 406 may also manage peripherals not integrated into the UE 400. In some implementations, the controller 406 may utilize an operating system such as iOS®, ANDROID®, WINDOWS®, or other operating systems. In some implementations, the controller 406 may be implemented as part of the processor 402.

In some implementations, the UE 400 may include at least one transceiver 408. In some other implementations, the UE 400 may have more than one transceiver 408. The transceiver 408 may represent a wireless transceiver. The transceiver 408 may include one or more receiver chains 410, one or more transmitter chains 412, or a combination thereof.

A receiver chain 410 may be configured to receive signals (e.g., control information, data, packets) over a wireless medium. For example, the receiver chain 410 may include one or more antennas to receive a signal over the air or wireless medium. The receiver chain 410 may include at least one amplifier (e.g., a low-noise amplifier (LNA)) configured to amplify the received signal. The receiver chain 410 may include at least one demodulator configured to demodulate the receive signal and obtain the transmitted data by reversing the modulation technique applied during transmission of the signal. The receiver chain 410 may include at least one decoder for decoding the demodulated signal to receive the transmitted data.

A transmitter chain 412 may be configured to generate and transmit signals (e.g., control information, data, packets). The transmitter chain 412 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 412 may also include at least one power amplifier configured to amplify the modulated signal to an appropriate power level suitable for transmission over the wireless medium. The transmitter chain 412 may also include one or more antennas for transmitting the amplified signal into the air or wireless medium.

Figure 5:
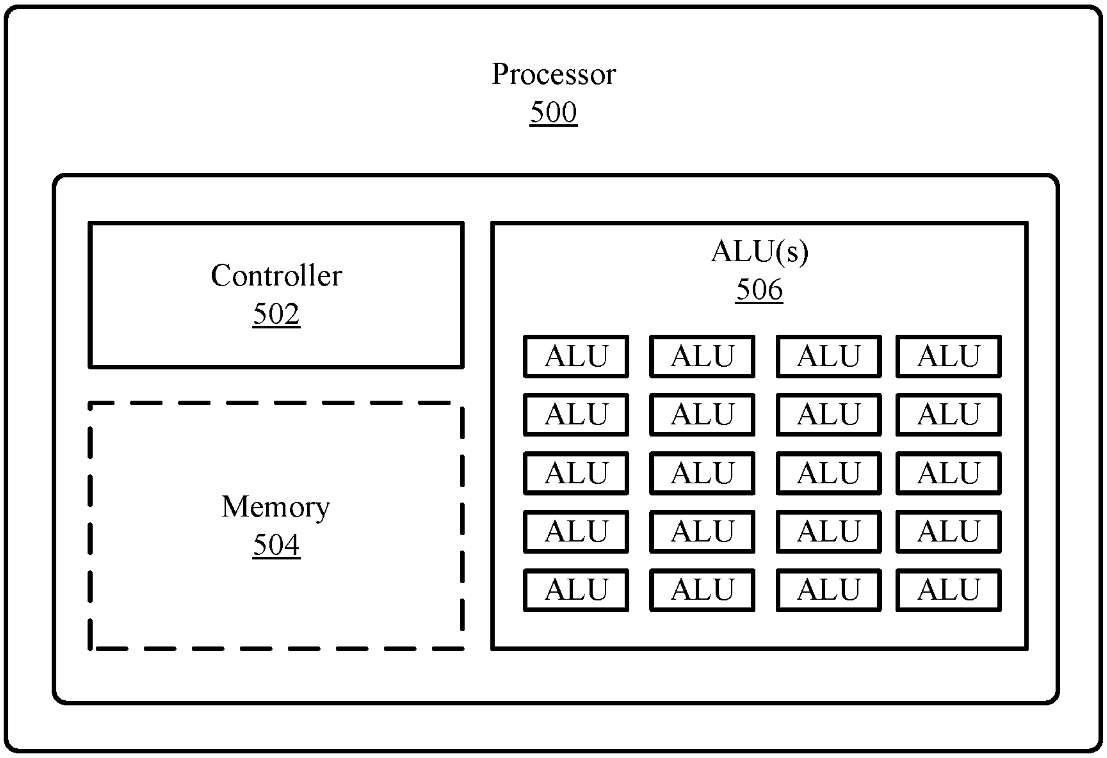
FIG. 5 illustrates an example of a processor in accordance with aspects of the present disclosure.

FIG. 5 illustrates an example of a processor 500 in accordance with aspects of the present disclosure. The processor 500 may be an example of a processor configured to perform various operations in accordance with examples as described herein. The processor 500 may include a controller 502 configured to perform various operations in accordance with examples as described herein. The processor 500 may optionally include at least one memory 504, which may be, for example, an L1/L2/L3 cache. Additionally, or alternatively, the processor 500 may optionally include one or more arithmetic-logic units (ALUs) 506. One or more of these components may be in electronic communication or otherwise coupled (e.g., operatively, communicatively, functionally, electronically, electrically) via one or more interfaces (e.g., buses).

The processor 500 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 500) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 502 may be configured to manage and coordinate various operations (e.g., signaling, receiving, obtaining, retrieving, transmitting, outputting, forwarding, storing, determining, identifying, accessing, writing, reading) of the processor 500 to cause the processor 500 to support various operations in accordance with examples as described herein. For example, the controller 502 may operate as a control unit of the processor 500, generating control signals that manage the operation of various components of the processor 500. These control signals include enabling or disabling functional units, selecting data paths, initiating memory access, and coordinating timing of operations.

The controller 502 may be configured to fetch (e.g., obtain, retrieve, receive) instructions from the memory 504 and determine subsequent instruction(s) to be executed to cause the processor 500 to support various operations in accordance with examples as described herein. The controller 502 may be configured to track memory addresses of instructions associated with the memory 504. The controller 502 may be configured to decode instructions to determine the operation to be performed and the operands involved. For example, the controller 502 may be configured to interpret the instruction and determine control signals to be output to other components of the processor 500 to cause the processor 500 to support various operations in accordance with examples as described herein. Additionally, or alternatively, the controller 502 may be configured to manage flow of data within the processor 500. The controller 502 may be configured to control transfer of data between registers, ALUs 506, and other functional units of the processor 500.

The memory 504 may include one or more caches (e.g., memory local to or included in the processor 500 or other memory, such as RAM, ROM, DRAM, SDRAM, SRAM, MRAM, flash memory, etc. In some implementations, the memory 504 may reside within or on a processor chipset (e.g., local to the processor 500). In some other implementations, the memory 504 may reside external to the processor chipset. (e.g., remote to the processor 500).

The memory 504 may store computer-readable, computer-executable code including instructions that, when executed by the processor 500, cause the processor 500 to perform various functions described herein. The code may be stored in a non-transitory computer-readable medium such as system memory or another type of memory. The controller 502 and/or the processor 500 may be configured to execute computer-readable instructions stored in the memory 504 to cause the processor 500 to perform various functions. For example, the processor 500 and/or the controller 502 may be coupled with or to the memory 504, the processor 500, and the controller 502, and may be configured to perform various functions described herein. In some examples, the processor 500 may include multiple processors and the memory 504 may include multiple memories. One or more of the multiple processors may be coupled with one or more of the multiple memories, which may, individually or collectively, be configured to perform various functions herein.

The one or more ALUs 506 may be configured to support various operations in accordance with examples as described herein. In some implementations, the one or more ALUs 506 may reside within or on a processor chipset (e.g., the processor 500). In some other implementations, the one or more ALUs 506 may reside external to the processor chipset (e.g., the processor 500). One or more ALUs 506 may perform one or more computations such as addition, subtraction, multiplication, and division on data. For example, one or more ALUs 506 may receive input operands and an operation code, which determines an operation to be executed. One or more ALUs 506 may be configured with a variety of logical and arithmetic circuits, including adders, subtractors, shifters, and logic gates, to process and manipulate the data according to the operation. Additionally, or alternatively, the one or more ALUs 506 may support logical operations such as AND, OR, exclusive-OR (XOR), not-OR (NOR), and not-AND (NAND), enabling the one or more ALUs 506 to handle conditional operations, comparisons, and bitwise operations.

The processor 500 may support wireless communication in accordance with examples as disclosed herein. The processor 500 may be configured to or operable to support at least one controller coupled with at least one memory and configured to cause the processor to: receive a NAS message that includes an indication of UPU header protection; compute a UPU MAC using a UPU header as at least one input for UPU protection; and transmit an acknowledgement that indicates a UPU header verification is successful.

Additionally, the processor 500 may be configured to or operable to support any one or combination of the at least one controller is configured to cause the processor to determine to perform the UPU header verification; and compute the UPU MAC based at least in part on the determination to perform the UPU header verification. The at least one controller is configured to cause the processor to compute the UPU MAC as UPU-MAC-$I_{AUSF}$ using the UPU header as the at least one input for the UPU protection. The at least one controller is configured to cause the processor to determine that the UPU header verification is successful. The at least one controller is configured to cause the processor to generate a MAC UPU-MAC-$I_{UE}$ that indicates the UPU header verification is successful. The at least one controller is configured to cause the processor to determine successful verification of the UPU header protection; and transmit a verification indication to UDM via an AMF that verification of the UPU header protection is successful. The at least one controller is configured to cause the processor to receive a capability request as to whether the UE supports the UPU header protection; and transmit a capability response that the UE supports the UPU header protection. The capability response is transmitted to an AMF in a NAS message as at least one of an initial registration request message or a registration update request message, the NAS message forwarded by the AMF to UDM to indicate that the UE supports the UPU header protection.

Figure 6:
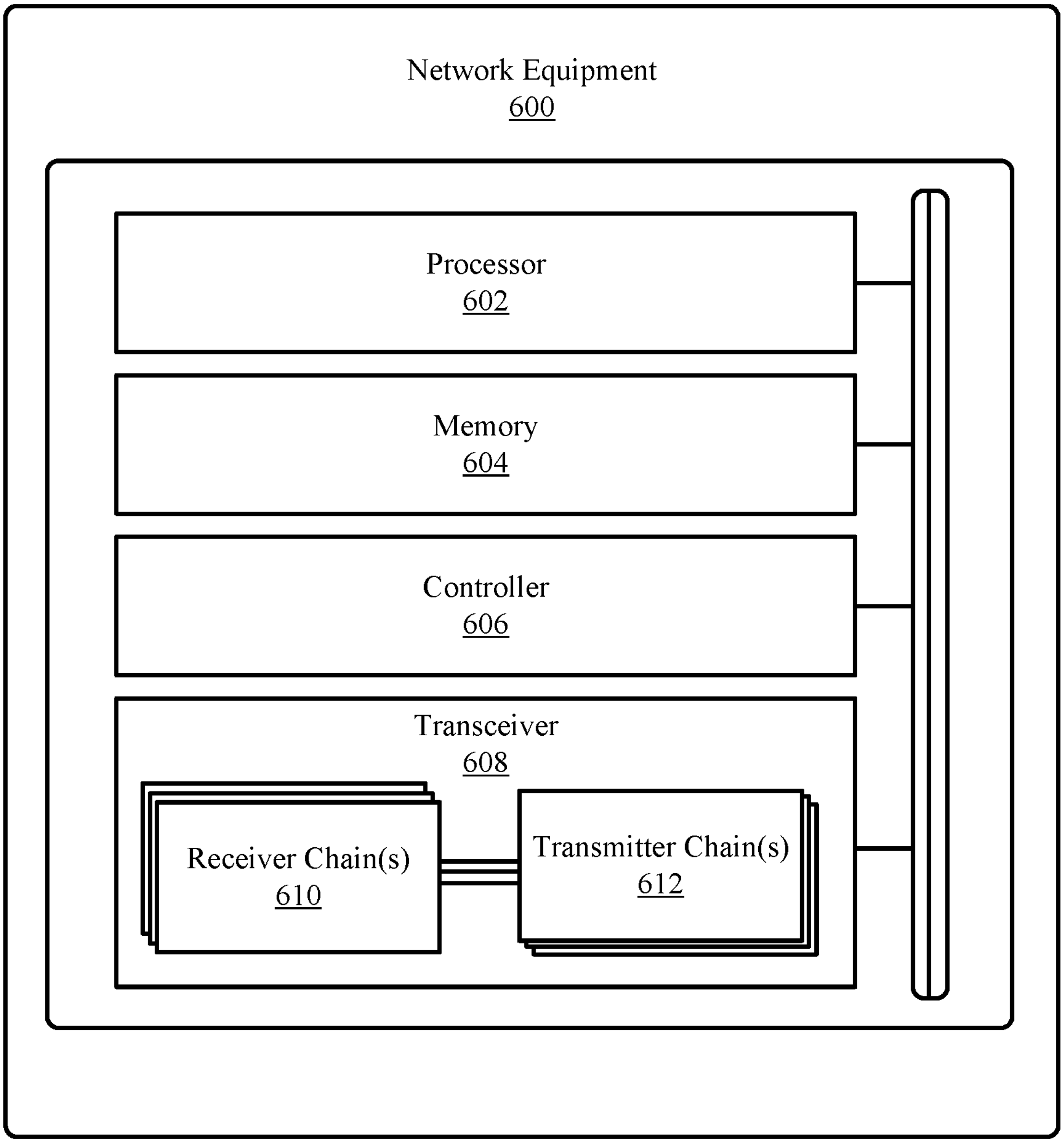
FIG. 6 illustrates an example of a network equipment (NE) in accordance with aspects of the present disclosure.

FIG. 6 illustrates an example of a NE 600 in accordance with aspects of the present disclosure. The NE 600 may include a processor 602, a memory 604, a controller 606, and a transceiver 608. The processor 602, the memory 604, the controller 606, or the transceiver 608, or various combinations thereof or various components thereof may be examples of means for performing various aspects of the present disclosure as described herein. These components may be coupled (e.g., operatively, communicatively, functionally, electronically, electrically) via one or more interfaces.

The processor 602, the memory 604, the controller 606, or the transceiver 608, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 602 may include an intelligent hardware device (e.g., a general-purpose processor, a DSP, a CPU, an ASIC, an FPGA, or any combination thereof). In some implementations, the processor 602 may be configured to operate the memory 604. In some other implementations, the memory 604 may be integrated into the processor 602. The processor 602 may be configured to execute computer-readable instructions stored in the memory 604 to cause the NE 600 to perform various functions of the present disclosure.

The memory 604 may include volatile or non-volatile memory. The memory 604 may store computer-readable, computer-executable code including instructions when executed by the processor 602 cause the NE 600 to perform various functions described herein. The code may be stored in a non-transitory computer-readable medium such as the memory 604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 602 and the memory 664 coupled with the processor 602 may be configured to cause the NE 600 to perform one or more of the functions described herein (e.g., executing, by the processor 602, instructions stored in the memory 604). For example, the processor 602 may support wireless communication at the NE 600 in accordance with examples as disclosed herein. The NE 600 (e.g., UDM) may be configured to or operable to support a means for transmitting a request to an AUSF to apply UPU header protection; and transmitting at least one of a UPU transparent container or UPU header information to a UE, the at least one UPU transparent container or the UPU header information including an indication that a UPU header is protected.

Additionally, the NE 600 may be configured to or operable to support any one or combination of the method further comprising transmitting a capability request as to whether the UE supports the UPU header protection; and receiving a capability response that the UE supports the UPU header protection. The method further comprising transmitting a capability request as to whether the UE supports the UPU header protection; receiving a capability response that indicates whether the UE supports the UPU header protection; and saving information as to UE capability to support the UPU header protection. The method further comprising determining to apply the UPU header protection. The request to the AUSF to apply the UPU header protection includes at least one of a first indication that the UPU header protection is required, or a second indication that a UPU header verification and acknowledgement is required. The method further comprising setting an acknowledgement required indication that confirms the UE received and successfully verified UPU data and the UPU header information. The method further comprising transmitting a related indication of the UPU header protection to the UE, the related indication indicating the UE to compute a UPU MAC using a UPU header as at least one input for UPU protection. The related indication indicates the UE to compute the UPU MAC as UPU-MAC-$I_{AUSF}$ using the UPU header as the at least one input for the UPU protection. The method further comprising generating the UPU transparent container with the indication that the UPU header protection is set in the UPU header. The method further comprising determining to apply the UPU header protection; and including one or more of a UPU data set type specific to the UPU header information, a length of a UPU data set specific to the UPU header information, and the UPU header information in UPU data transmitted to the UE that supports the UPU header protection. The UPU header information included in the UPU data provides for integrity protection of the UPU header information. The method further comprising determining to apply the UPU header protection; and including an indication in UPU header transmitted to the UE that the UPU header is protected as part of the UPU data.

Additionally, or alternatively, the NE 600 may support at least one memory and at least one processor coupled with the at least one memory and configured to cause the NE to: transmit a request to an AUSF to apply UPU header protection; and transmit at least one of a UPU transparent container or UPU header information to a UE, the at least one UPU transparent container or the UPU header information including an indication that a UPU header is protected.

Additionally, the NE 600 may be configured to support any one or combination of the at least one processor is configured to cause the NE to transmit a capability request as to whether the UE supports the UPU header protection; and receive a capability response that the UE supports the UPU header protection. The at least one processor is configured to cause the NE to transmit a capability request as to whether the UE supports the UPU header protection; receive a capability response that indicates whether the UE supports the UPU header protection; and save information as to UE capability to support the UPU header protection. The at least one processor is configured to cause the NE to determine to apply the UPU header protection. The request to the AUSF to apply the UPU header protection includes at least one of a first indication that the UPU header protection is required, or a second indication that a UPU header verification and acknowledgement is required. The at least one processor is configured to cause the NE to set an acknowledgement required indication that confirms the UE received and successfully verified UPU data and the UPU header information. The at least one processor is configured to cause the NE to transmit a related indication of the UPU header protection to the UE, the related indication indicating the UE to compute a UPU MAC using a UPU header as at least one input for UPU protection. The related indication indicates the UE to compute the UPU MAC as UPU-MAC-$I_{AUSF}$ using the UPU header as the at least one input for the UPU protection. The at least one processor is configured to cause the NE to generate the UPU transparent container with the indication that the UPU header protection is set in the UPU header. The at least one processor is configured to cause the NE to determine to apply the UPU header protection; and includes one or more of a UPU data set type specific to the UPU header information, a length of a UPU data set specific to the UPU header information, and the UPU header information in UPU data transmitted to the UE that supports the UPU header protection. The UPU header information included in the UPU data provides for integrity protection of the UPU header information. The at least one processor is configured to cause the NE to determine to apply the UPU header protection; and include an indication in UPU header transmitted to the UE that the UPU header is protected as part of the UPU data.

In some implementations, the processor 602 and the memory 604 coupled with the processor 602 may be configured to cause the NE 600 to perform one or more of the functions described herein (e.g., executing, by the processor 602, instructions stored in the memory 604). For example, the processor 602 may support wireless communication at the NE 600 in accordance with examples as disclosed herein. The NE 600 (e.g., AMF) may be configured to or operable to support a means for receiving, from UDM, at least one of a UPU transparent container or UPU header information that includes a UPU header protection indication for a UE; and transmitting, to the UE, the UPU transparent container or the UPU header information.

Additionally, the NE 600 may be configured to or operable to support any one or combination of the method further comprising transmitting the UPU transparent container or the UPU header information to the UE as a NAS message that includes the indication of the UPU header protection. The method further comprising generating the UPU transparent container with UPU header including the UPU header protection indication if the transparent container is not received from the UDM and if it receives the UPU header protection indication information element.

Additionally, or alternatively, the NE 600 may support at least one memory and at least one processor coupled with the at least one memory and configured to cause the NE to: receive, from UDM, at least one of a UPU transparent container or UPU header information that includes a UPU header protection indication for a UE; and transmit, to the UE, the UPU transparent container or the UPU header information.

Additionally, the NE 600 may be configured to support any one or combination of the at least one processor is configured to cause the NE to transmit the UPU transparent container or the UPU header information to the UE as a NAS message that includes the indication of the UPU header protection. The at least one processor is configured to cause the NE to generate the UPU transparent container with UPU header including the UPU header protection indication if the transparent container is not received from the UDM and if it receives the UPU header protection indication information element.

The controller 606 may manage input and output signals for the NE 600. The controller 606 may also manage peripherals not integrated into the NE 600. In some implementations, the controller 606 may utilize an operating system such as iOS®, ANDROID®, WINDOWS®, or other operating systems. In some implementations, the controller 606 may be implemented as part of the processor 602.

In some implementations, the NE 600 may include at least one transceiver 608. In some other implementations, the NE 600 may have more than one transceiver 608. The transceiver 608 may represent a wireless transceiver. The transceiver 608 may include one or more receiver chains 610, one or more transmitter chains 612, or a combination thereof.

A receiver chain 610 may be configured to receive signals (e.g., control information, data, packets) over a wireless medium. For example, the receiver chain 610 may include one or more antennas to receive a signal over the air or wireless medium. The receiver chain 610 may include at least one amplifier (e.g., a low-noise amplifier (LNA)) configured to amplify the received signal. The receiver chain 610 may include at least one demodulator configured to demodulate the receive signal and obtain the transmitted data by reversing the modulation technique applied during transmission of the signal. The receiver chain 610 may include at least one decoder for decoding the demodulated signal to receive the transmitted data.

A transmitter chain 612 may be configured to generate and transmit signals (e.g., control information, data, packets). The transmitter chain 612 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 612 may also include at least one power amplifier configured to amplify the modulated signal to an appropriate power level suitable for transmission over the wireless medium. The transmitter chain 612 may also include one or more antennas for transmitting the amplified signal into the air or wireless medium.

Figure 7:
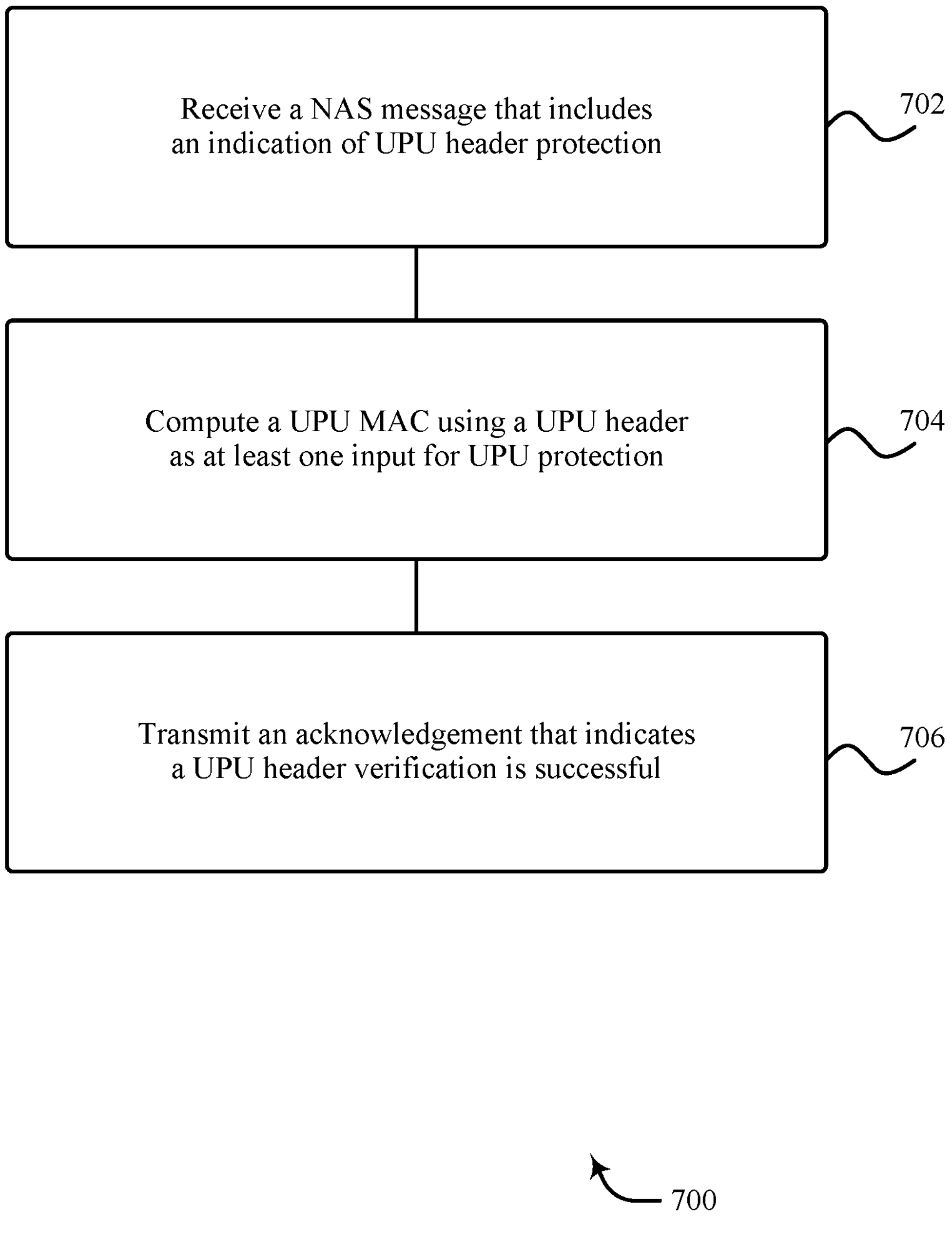
FIG. 7 illustrates a flowchart of a method performed by a UE in accordance with aspects of the present disclosure.

FIG. 7 illustrates a flowchart of a method 700 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 702, the method may include receiving a NAS message that includes an indication of UPU header protection. The operations of 702 may be performed in accordance with examples as described herein. In some implementations, aspects of the operations of 702 may be performed by a UE as described with reference to FIG. 4.

At 704, the method may include computing a UPU MAC using a UPU header as at least one input for UPU protection. The operations of 704 may be performed in accordance with examples as described herein. In some implementations, aspects of the operations of 704 may be performed by a UE as described with reference to FIG. 4.

At 706, the method may include transmitting an acknowledgement that indicates a UPU header verification is successful. The operations of 706 may be performed in accordance with examples as described herein. In some implementations, aspects of the operations of 706 may be performed a UE as described with reference to FIG. 4.

Figure 8:
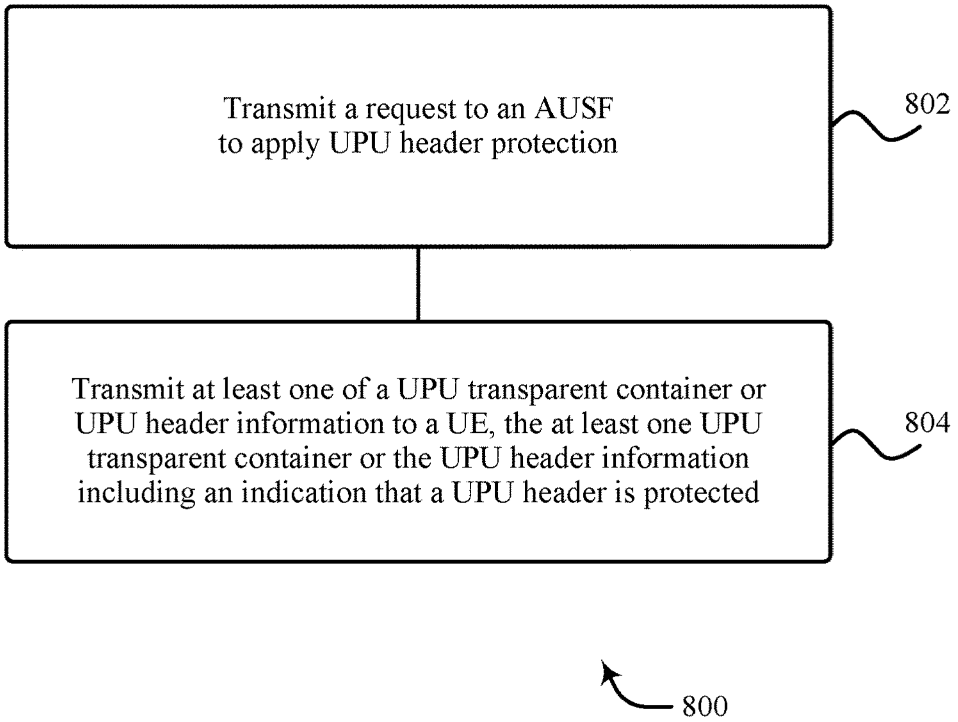
FIG. 8 illustrates a flowchart of a method performed by a NE (e.g., UDM) in accordance with aspects of the present disclosure.

FIG. 8 illustrates a flowchart of a method 800 in accordance with aspects of the present disclosure. The operations of the method may be implemented by a NE (e.g., UDM) as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 802, the method may include transmitting a request to an AUSF to apply UPU header protection. The operations of 802 may be performed in accordance with examples as described herein. In some implementations, aspects of the operations of 802 may be performed by a NE as described with reference to FIG. 6.

At 804, the method may include transmitting at least one of a UPU transparent container or UPU header information to a UE, the at least one UPU transparent container or the UPU header information including an indication that a UPU header is protected. The operations of 804 may be performed in accordance with examples as described herein. In some implementations, aspects of the operations of 804 may be performed by a NE as described with reference to FIG. 6.

Figure 9:
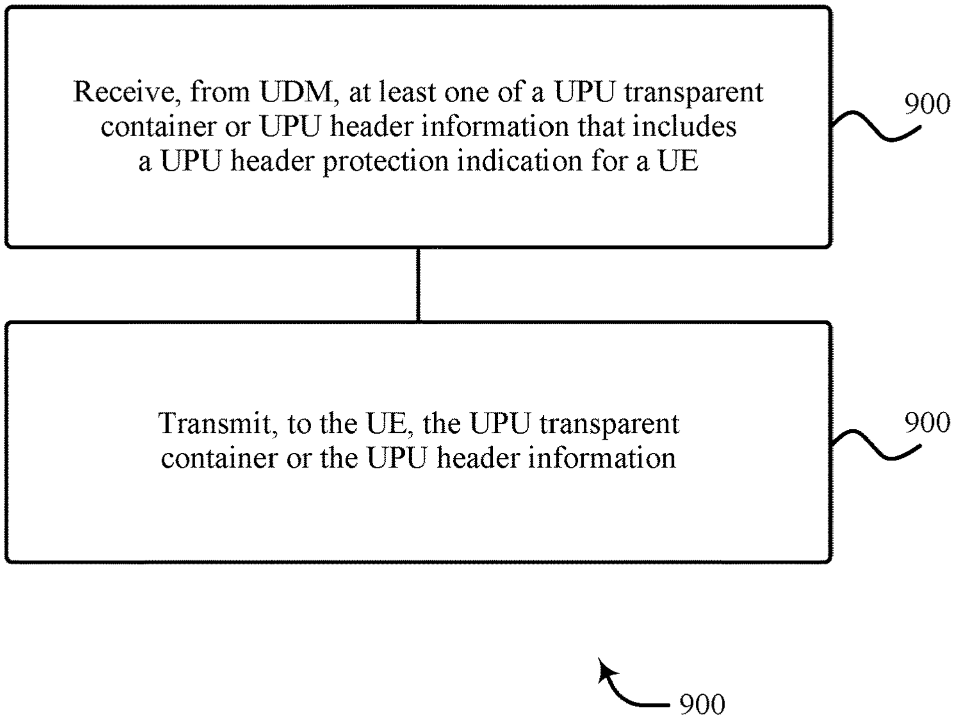
FIG. 9 illustrates a flowchart of a method performed by a NE (e.g., AMF) in accordance with aspects of the present disclosure.

FIG. 9 illustrates a flowchart of a method 900 in accordance with aspects of the present disclosure. The operations of the method may be implemented by a NE (e.g., AMF) as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 902, the method may include receiving, from UDM, at least one of a UPU transparent container or UPU header information that includes an indication of UPU header protection for a UE. The operations of 902 may be performed in accordance with examples as described herein. In some implementations, aspects of the operations of 902 may be performed by a NE as described with reference to FIG. 6.

At 904, the method may include transmitting, to the UE, the UPU transparent container or the UPU header information. The operations of 904 may be performed in accordance with examples as described herein. In some implementations, aspects of the operations of 904 may be performed by a NE as described with reference to FIG. 6.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- at least one memory; and
- at least one processor coupled with the at least one memory and operable to cause the UE to:
  - receive a non-access stratum (NAS) message that includes a UE parameter update (UPU) transparent container, the UPU transparent container including a UPU header, the UPU header including an indication of UPU header protection;
  - compute a UPU message authentication code (MAC) using the UPU header as at least one input for UPU protection; and
  - transmit an acknowledgement that indicates a UPU header verification is successful.

2. The UE of claim 1, wherein the at least one processor is operable to cause the UE to:
- determine to perform the UPU header verification; and compute the UPU MAC based at least in part on the determination to perform the UPU header verification.

3. The UE of claim 1, wherein the at least one processor is operable to cause the UE to compute the UPU MAC as UPU-MAC-$I_{AUSF}$ using the UPU header as the at least one input for the UPU protection.

4. The UE of claim 1, wherein the at least one processor is operable to cause the UE to determine that the UPU header verification is successful.

5. The UE of claim 1, wherein the at least one processor is operable to cause the UE to generate a MAC UPU-MAC-$I_{UE}$ that indicates the UPU header verification is successful.

6. The UE of claim 1, wherein the at least one processor is operable to cause the UE to:
- determine successful verification of the UPU header protection; and
- transmit a verification indication to unified data management (UDM) via an access and mobility management function (AMF) that verification of the UPU header protection is successful.

7. The UE of claim 1, wherein the at least one processor is operable to cause the UE to:
- receive a capability request as to whether the UE supports the UPU header protection; and transmit a capability response that the UE supports the UPU header protection.

8. The UE of claim 7, wherein the capability response is transmitted to an access and mobility management function (AMF) in a NAS message as at least one of an initial registration request message or a registration update request message, the NAS message forwarded by the AMF to unified data management (UDM) to indicate that the UE supports the UPU header protection.

9. A processor for wireless communication, comprising:
- at least one controller coupled with at least one memory and operable to cause the processor to:
  - receive a non-access stratum (NAS) message that includes a UE parameter update (UPU) transparent container, the UPU transparent container including a UPU header, the UPU header including an indication of UPU header protection;
  - compute a UPU message authentication code (MAC) using the UPU header as at least one input for UPU protection; and
  - transmit an acknowledgement that indicates a UPU header verification is successful.

10. The processor of claim 9, wherein the at least one controller is operable to cause the processor to:
- determine to perform the UPU header verification; and
- compute the UPU MAC based at least in part on the determination to perform the UPU header verification.

11. The processor of claim 9, wherein the at least one controller is operable to cause the processor to compute the UPU MAC as UPU-MAC-$I_{AUSF}$ using the UPU header as the at least one input for the UPU protection.

12. The processor of claim 9, wherein the at least one controller is operable to cause the processor to determine that the UPU header verification is successful.

13. The processor of claim 9, wherein the at least one controller is operable to cause the processor to generate a MAC UPU-MAC-$I_{UE}$ that indicates the UPU header verification is successful.

14. The processor of claim 9, wherein the at least one controller is operable to cause the processor to:
- determine successful verification of the UPU header protection; and transmit a verification indication to unified data management (UDM) via an access and mobility management function (AMF) that verification of the UPU header protection is successful.

15. The processor of claim 9, wherein the at least one controller is operable to cause the processor to:

receive a capability request as to whether the UE supports the UPU header protection; and transmit a capability response that the UE supports the UPU header protection.

16. The processor of claim 15, wherein the capability response is transmitted to an access and mobility management function (AMF) in a NAS message as at least one of an initial registration request message or a registration update request message, the NAS message forwarded by the AMF to unified data management (UDM) to indicate that the UE supports the UPU header protection.

17. A method performed by a user equipment (UE), the method comprising:

receiving a non-access stratum (NAS) message that includes a UE parameter update (UPU) transparent container, the UPU transparent container including a UPU header, the UPU header including an indication of UPU header protection; computing a UPU message authentication code (MAC) using the UPU header as at least one input for UPU protection; and transmitting an acknowledgement that indicates a UPU header verification is successful.

18. The method of claim 17, further comprising:

determining to perform the UPU header verification; and computing the UPU MAC based at least in part on the determination to perform the UPU header verification.

19. The method of claim 17, further comprising:

computing the UPU MAC as UPU-MAC-$I_{AUSF}$ using the UPU header as the at least one input for the UPU protection.

20. A network equipment (NE) for wireless communication, comprising:

at least one memory; and at least one processor coupled with the at least one memory and operable to cause the NE to:

receive a capability indication that a user equipment (UE) supports user equipment parameter update (UPU) header protection;

transmit a request to an authentication server function (AUSF) to apply the UPU header protection, the request including UPU data that includes UPU header information; and transmit a UPU transparent container to the UE, the UPU transparent container including a UPU header that includes an indication of the UPU header protection.

* * * * *